United States Patent [19]

Lewis et al.

[11] Patent Number: 5,256,438
[45] Date of Patent: Oct. 26, 1993

[54] NON-FREEZE FRUIT PRODUCTS AND PROCESSES

[75] Inventors: Victor M. Lewis; David A. Lewis, both of Sydney, Australia

[73] Assignee: Byron Agricultural Company Pty. Ltd., Sydney, Australia

[21] Appl. No.: 872,153

[22] Filed: Apr. 22, 1992

[30] Foreign Application Priority Data

Apr. 24, 1991 [AU] Australia .............................. PK5811

[51] Int. Cl.$^5$ .......................... A23B 7/02; A23B 7/04
[52] U.S. Cl. ................................. 426/615; 426/384;
426/385; 426/444; 426/465; 426/489; 426/524;
426/583; 426/616
[58] Field of Search ............... 426/583, 615, 384, 385,
426/444, 489, 524, 465, 616

[56] References Cited

U.S. PATENT DOCUMENTS

| | | | |
|---|---|---|---|
| 2,723,199 | 11/1955 | Todd | ..................... 426/489 |
| 3,408,208 | 10/1968 | Lamb . | |
| 4,146,652 | 3/1979 | Kahn et al. . | |
| 4,332,824 | 6/1982 | Kahn et al. . | |
| 4,350,711 | 9/1982 | Kahn et al. . | |
| 4,356,195 | 10/1982 | Kahn et al. . | |
| 4,390,550 | 6/1983 | Kahn et al. . | |
| 4,418,082 | 11/1983 | Kahn et al. . | |
| 4,551,384 | 11/1985 | Aston et al. . | |
| 4,647,469 | 3/1987 | Jakobsson et al. . | |
| 4,713,252 | 12/1987 | Ismail . | |
| 5,110,609 | 5/1992 | Lewis et al. | ..................... 426/465 |

FOREIGN PATENT DOCUMENTS

575198  8/1985  Australia .

OTHER PUBLICATIONS

Tamime et al, 1985, Yogurt Science and Technology, Pergamon Press, p. 63.
Tressler et al, 1968, The Freezing Preservation of Foods, Avi Publishing Co., Inc., Westport, Conn., pp. 169, 348, 349, 363.

Primary Examiner—Helen F. Pratt
Attorney, Agent, or Firm—Scully, Scott, Murphy & Presser

[57] ABSTRACT

The invention relates to ready-to-eat preserved edible fruit products which consists of natural fruit or fruit pieces which have been dehydrated to a soluble solids level of 40% to 60%, a moisture level of 35% to 55% and a water activity level of 0.75 to 0.90 and to processes of producing such products and foods containing such products. The product remains unfrozen at temperatures within the range of 0° C. to −25° C.

11 Claims, No Drawings

NON-FREEZE FRUIT PRODUCTS AND PROCESSES

FIELD OF THE INVENTION

The present invention relates to low-temperature stable fruits not containing added solutes, products containing such fruit and processes for the production thereof. These freeze stable fruits remain unfrozen, flexible and soft when stored below 0° C.

BACKGROUND OF THE INVENTION

Fruits are regarded as a highly desirable food, both from a nutritional and an organoleptic viewpoint. Most fruits are seasonal, many with quite short periods of availability. Distribution of various types of fruits depends to a large extent on latitude. Tropical fruits are not readily available in temperate and cold-climates, and temperate and cold climate fruits are not readily available in tropical areas.

The preservation of fruits represents a large industry. Common methods of preservation include canning, freezing, sun drying, freeze-drying and hot air drying.

The canned fruit industry is an extensive one and most fruits lend themselves to canning. The main disadvantages of canned fruits is their high cost of production, bulky nature, and associated high freight costs. Canned fruits are not very convenient for industrial use since can size is severely limited and cans are becoming increasingly more expensive.

Dried fruits, such as apple, pear, apricot, peach cherry etc are shelf-stable products, which, for storage at ambient temperatures, must be dried to moisture contents of 17% (or lower) to 23%. The drying of fruits to these low moisture levels requires long dehydration periods, often in the order of 16 to 24 hours. During this long period of dehydration, the sugars in the fruits become partially caramelized, the natural aroma of the fruit is lost and the color darkens. The retention of color during dehydration and storage can be maintained to some extent by the addition of sulfur dioxide or sulfites to the fruits, but this in itself adds a "sulfur" flavor, the use of sulfur dioxide is becoming unacceptable and the demand for additive-free fruit products is increasingly important.

Dried fruits, darken appreciably on storage, tend to be tough and leathery to eat and have flavors that differ substantially from that of fresh fruits.

Frozen fruits are common articles of commerce, but have not developed into a major consumer group of products mainly because frozen fruits are slow to thaw and, because of production of ice crystals in the fruit on freezing, there is substantial "drip" from the fruit on thawing. The tissues, as a result of the ice crystal damage, become mushy, and unattractive to eat unless consumed in a semi-frozen state.

A substantial market for fruits is in products such as yogurts and ice creams. Up to the present time, fruit of satisfactory quality for use in this type of produce is not readily available. Canned fruits tend to be too soft and "mushy" for use in yogurts, they are bulky to store and inconvenient to use since the cans have to be opened and the contents drained. They cannot be satisfactorily used in frozen desserts such as ice cream because the fruit pieces freeze hard and are therefore objectionable.

Frozen fruits are likewise unsuitable for ice creams because they are too hard. In yogurt they lack flavor intensity, have to be thawed for use with subsequent drip, are not sweet enough and are generally less than satisfactory.

Conventional dried fruits can be used in yogurt, but are unattractive in color and lack distinctive flavors. The presence of sulfur dioxide in the fruit can have a disadvantage for the reason that sulfur dioxide can be a deleterious effect on the yogurt organisms. If used in ice cream, the fruit pieces become excessively hard and lack natural flavor.

Some fruit products are known which are regarded as satisfactory for use in ice creams and similar products. The patents of Kahn, et al. (U.S. Pat. Nos. 4,332,824, 4,356,195, 4,418,082, 4,350,711, 4,390,550 and 4,551,384) describe the production of fruits and fruit products which are impregnated with sugar solution (where 50% of the sugars are in the form of dextrose or fructose). The fruits are produced by a form of osmotic dehydration, and are steeped in increasingly concentrated sugar solutions. These products will not freeze at normal freezer temperatures of 0° C. to −15° C., however, steeping causes loss of fruit flavor and acid and the products are excessively sweet. Moreover, the products tend to be expensive since considerable wastage of sugar solutions occurs.

Other fruit products have been described whereby partial dehydration of apples to about one-half their weight is followed by hard freezing as disclosed in U.S. Pat. No. of Jakobsson, et al. 4,647,469, U.S. Pat. No. 4,713,252, of Ismail, which coats fruit with sugar or sugar syrup to dehydrate and U.S. Pat. No. 3,408,208, of Lamb, which cooks and then partially dehydrates vegetables or meat and freezes the same; but in these cases, no attempt is made to produce a product which is resistant to becoming hard when frozen.

Lewis, et al. (Australian Patent No. 575,198) have described a process for the production of shelf-stable high moisture fruits. This process requires the use of low levels of sulfur dioxide in many fruits to avoid discoloration on storage and the products need to be held in an oxygen free atmosphere. There is now a universal consumer resistance to the use of even low levels of sulfur dioxide in all foods.

SUMMARY OF THE INVENTION

The present invention has for its object the provision of a natural edible fruit product without added sugars or other added water activity controlling solute, which will not freeze at 0° C. to −25° C., more particularly −15° C. to −25° C., preferably about −20° C. The term "freeze" as used herein is meant to convey a state where ice and/or solute crystals are formed in a product making it hard and/or brittle. Such a product can be added to yogurts, ice creams, frozen desserts etc. without itself freezing so that it is soft to eat. This is surprising in the light of the teaching in the mentioned prior art which requires the addition of substantial amounts of sugars to achieve a non-freeze product. The product is prepared by dehydrating fruit, optionally after blanching to at least 20% to about 50% of its original weight effective to reach a final sugar solids contents of about 50% by weight in the partially dehydrated fruit. The dehydrated fruit is then placed at freezer temperature. The products of the present invention have a high intensity of natural fruit flavor, a quality which is important particularly in the ice cream industry where intensely flavored products are necessary to produce an acceptable flavor impact required by industry.

DETAILED DESCRIPTION OF THE INVENTION

The invention is applicable to all types of edible fruits.

The fruits are washed, graded and prepared for dehydration in appropriate ways.

The invention in its broadest form comprises a ready-to-eat preserved edible fruit product comprising natural fruit or fruit pieces which have been dehydrated to a soluble solids content of 40% to 60%, preferably about 45% to about 55%, a moisture content of 35% to 55%, preferably about 40% to about 50%, and a water activity of 0.75 to 0.90, preferably about 0.8 to about 0.9, said product having no water activity controlling solutes added thereto and remaining unfrozen at temperatures within the range of 0° C. to −25° C., preferably −15° C. to −25° C.

The invention also relates to a process for preparing a preserved ready-to-eat edible fruit product of the type referred to and to products containing such fruit product.

Larger fruits such as apples, pears, mangos, cantaloupes, peaches and pineapples are peeled and cut into pieces of the required size. Fruit such as some apple varieties that discolor due to the presence of polyphenol oxidases may be blanched after preparation for a short period before dehydration. However, it has been found that even with fruits such as apples, a very short steam blanch, just sufficient to inactivate enzymes at the surface of the fruit, is sufficient to prevent browning during dehydration. Inactivation of enzymes within the body of apple pieces then occurs during the heating which occurs during the dehydration process. This minimal blanch has negligible effect on leaching of solutes from the fruit piece and on the texture of the processed fruit. Other diced or cut fruits are fed directly on to the belt or tray of a dehydrator. Fruits such as seedless grapes, prunes, blueberries, raspberries and cherries, may be fed directly to the dehydrator. In some instances, treatment of the skins with steam, hot water or alkali may be desirable to aid in removing the waxy coating on the skin or to produce small cracks in the skin which aid in rapid dehydration.

The fruits are dehydrated to a soluble solids content of about 40% to 60%, preferably about 50% sugar soluble solids depending on the nature of the fruits. Dehydration may be carried out in any form of dryer such as through--bed or cross-flow hot air dryer, vacuum drying, a reverse-cycle (electric dehumidifier heat pump) dryer or any combination of these. In the initial stages of drying, temperature up to 100° C., preferably 40° C. to 100° C., may be used, though the preferred temperature in a hot air dryer is 60° C. to 70° C. In a reverse-cycle or vacuum dryer, temperatures will be considerably lower, preferably 40° C. to 50° C. As the fruit dries, the temperature may be decreased to avoid scorching. If a hot air dryer is used, when most of the water has been removed and the drying rate becomes slower, the latter stages may be carried out in a vacuum or reverse-cycle dryer at temperatures of about 30° C. to 60° C., preferably about 45° C., but this is not essential. In general, a 45% to 55% soluble solids content is preferable with about 50% most preferred. The end-point of the process can readily be determined by taking refractometer, moisture, or water activity readings. After drying to the required soluble solids content, the fruit is cooled, packaged and placed in the freezer either immediately or after an equilibration period of, for example, 24 hours.

After dehydration, the water activity of the fruit will have been reduced to a level 0.75 to 0.9 at which it will not readily spoil. If, therefore, the temperature of the product rises above 0° C. for short periods during storage or transport, the product is not materially affected, and it is not subject to damage due to freezing and thawing as is usual with frozen foods. However, if the product is held for extended periods at temperature above freezing, slow spoilage by microorganisms and color deterioration may occur. Accordingly, such products are quite different from the well known dried fruits of commerce.

In the dehydration of fruits, the initial loss of moisture is relatively rapid. The drying of fruits to 50% moisture content takes approximately 25% of the time it takes to dry the same product to 20% moisture. Furthermore, as the solutes in the fruit become more concentrated with dehydration the more rapidly do chemical and physical changes occur. In the dehydration of fruits to the traditional levels of about 20% or lower, most of the undesirable flavor and color changes occur when the moisture level decreases below about 35%.

In ice creams and frozen desserts, it is usual for the pieces of fruit used to be of a size no larger than 10 mm × 10 mm. We have found to dehydrate pre-diced or otherwise prepared pieces of fruit of this approximate volume or size to the solute content such that they do not freeze, may require as little as approximately 60 minutes at 70° C. in a dehydrator with good air flow. This makes the process very economical in terms of energy usage and plant capacity. Since no ice is produced when the dehydrated fruits are placed in the freezer at normal freezer temperatures, the energy used to reduce the fruit to the temperature of the freezer is very low. Because the volume has been decreased substantially to about 25% to 12% of the original fruit volume, freezer storage costs and transport costs are greatly reduced. This is particularly important where long distance or international shipment is necessary thus, this product has a further considerable advantage over normal frozen fruits.

Most of the solids in fruits is in the form of sugars. The types of the sugars vary from fruit to fruit but are generally in the form of sucrose, dextrose and fructose, almost always a mixture. The sugar content of fruits generally varies between 10% and 20%. Occasionally lower, especially in unripe fruits, and sometimes higher in fruits such as sultana grapes and prune plums where it can approach 25%. Our invention involves increasing the natural sugar content to about 40% to 60%, preferably 45% to 55% and usually about 50% sugar content. For example, a sultana grape with a sugar content of about 25% would be dried to about 50% of its original weight, whereas an apple, at 12.5% sugar content would be dried to about 25% of its original weight. The "non-freeze" apple piece at 50% sugar (or 50% soluble solids) and a total solids content of about 5% greater than the sugar solids content and would be about four times as sweet as the fresh apple and have up to four times the concentration of apple flavor. With fruits at about 50% soluble solids, measurements are easily made with a refractometer, but of course other chemical or physical methods can be used.

The processed product can be consumed directly out of the freezer. It is quite soft to bite, has a good mouthfeel, and as there is no ice present in the product it does not feel excessively cold in the mouth since little heat is extracted from the mouth in melting the contained ice. As the soluble solids in fruits are predominantly sugars, the sweetness of the "non-freeze" piece of fruit will be at least two up to five times sweeter than the original fruit and the natural fruit flavor is similarly concentrated. This makes such products ideal for their intended use and superior to any alternative processed fruit. No solutes are lost from the fruit during the process, and no solutes are added. It has not been found necessary to add sulphur dioxide or sulfites and shelf-life in the freezer at about −20° C. can be over two years.

We achieve the preferred 50% soluble sugar solids content by reducing the weight of the raw, and optionally blanched fruit to 20% to about 50%, preferably 25% to 45% of the original raw fruits weight. This represents a greater than two fold to 5 fold reduction in weight. The degree of weight reduction is controlled to obtain a target 50% soluble sugar solids content in the product prior to subjecting the fruit to freezer conditions. In commerce a range of 40% to 60%, preferably 45% to 55% soluble solids, is satisfactory although we prefer to reach the target of about 50% soluble solids prior to freezing.

After dehydration to about 50% solids the raw dehydrated fruit it is subjected to frozen food storage conditions of 0° to −30° C., preferably −20° C. by conventional means.

While these product have been developed for use in frozen confections and for eating out of hand, they can as stated be used in any other way that natural or preserved fruits are used. Thus, they can be combined with a food base such as milk products including ice cream, yogurt, milk puddings, and other food bases such as pie fillings, cakes, Danish pastries, fruit jellies or other solid, semisolid or liquid foods to which fruit is commonly added. Because they are partially dehydrated, they retain their shape and texture. If placed in liquids such as water, light syrups, or yogurt they rehydrate rapidly and take on the appearance, flavor and texture of fresh fruit pieces. For addition to some solid and semisolid products such as ice cream and yogurts, some manufacturers require a pasteurized fruit piece. This may be readily achieved with the fruit prepared by this process, for example, by heating to the required temperature in a minimal quantity of light syrup. During this pasteurization process, the syrup used as the heating medium can be almost totally absorbed by the fruit pieces.

The invention will now be described by way of the following non-limiting embodiments.

EXAMPLE 1

Apples of the Golden Delicious variety were peeled, diced into pieces approximately 20 mm × 10 mm and steam blanched for 1 ½ minutes. The blanched dice had soluble solids as measured by refractometer of 13%. The dice were dried in a through-bed hot air dryer with rapid air flow for 15 minutes at 100° C. The temperature was reduced to 70° C. and the dice dried to a soluble solids content of 50%. This involved a weight loss of approximately 74%. The drying was complete in about 56 minutes. The final moisture content of the apple pieces was 43% and the water activity was 0.86. The apple pieces were allowed to stand for 2 hours and were then placed in a freezer at −20° C. After storage for twelve months at −20° C., the apples had not deteriorated in color and were not frozen. They could be readily eaten directly out of the freezer.

Some apple dice were taken out of the freezer and added to full cream yogurt. After standing in the yogurt for 24 hours at 4° C., the apple pieces had absorbed moisture from the yogurt and had a fresh taste and crisp texture much superior to commercial apple yogurt prepared from canned apple dice.

EXAMPLE 2

Pineapples of the rough-leaf variety were peeled, cored and cut into segments approximately 10 mm thick and 20 mm wide. The pineapple pieces had a soluble solids content of 17%. The pieces were dried in a hot air dryer at 70° C. for 30 minutes, and were then transferred to a reverse-cycle (dehumidifier heat-pump type) dryer at 45° C. for a further 50 minutes, by which time the soluble solids content was 45%. The moisture content was 48% and the water activity 0.90. The fruit pieces were a bright yellow color, had a fresh aroma and typical pineapple flavor. They were placed in a freezer at −20° C. After storage for 9 months, the fruit pieces were not frozen and were sufficiently tender to be eaten directly out of the freezer. No apparent deterioration in flavor or color had occurred.

Pieces of pineapple were mixed with soft frozen ice cream and the mixture placed in the freezer at −20° C. and stored for 7 days. On consumption, the pineapple pieces were soft to eat and had an intense pineapple flavor.

EXAMPLE 3

Sour cherries of the North Star variety were pitted and placed in a hot air dryer. The soluble solids content of the cherries was 17%. They were dried to a soluble solids content of 55%. Drying time was 2 ½ hours. After drying the cherries had a moisture content of 43% and a water activity of 0.87. They had a typical cherry-red color and intense cherry flavor. They were placed in the freezer at −20° C. and stored for 12 months. The cherries did not freeze and no apparent deterioration had occurred.

The stored cherries were used to prepare yogurt and ice cream as in Examples 1 and 2, and also used to prepare a fruit desert jelly. For the fruit jelly the cherries were simmered in apple juice for 5 minutes, and some pre-moistened gelatine was added and dissolved. The jelly was put aside to cool and then chilled to set. The set jelly contained plump cherries with excellent color and flavor.

EXAMPLE 4

Pears of the "Williams" variety were peeled, cored and cut into halves. The pear halves were blanched in steam for two minutes. The soluble solids content of the blanched halves was 14%. The halves were dried in hot air on trays at 70° C. until the soluble solids was 55%. Dehydration time was 4 ½ hours. The water activity of the resultant pears was 0.77 and the moisture content 39.7%. The pears had a bright yellowish color and an intense typical pear flavor. The pear halves were placed in the freezer at −20° C. After 7 months storage, no apparent deterioration had occurred.

We claim:

1. A ready-to-eat preserved edible fruit product comprising dehydrated natural fruit or fruit pieces having a soluble solids content of 40% to 60%, a moisture content of 35% to 55% and a water activity of 0.75 to 0.90, said product containing no added water activity controlling solutes and said product remaining unfrozen, flexible and soft at temperatures of about −20° C.

2. A ready-to-eat preserved edible fruit product as claimed in claim 1 wherein the natural fruit or fruit pieces have been blanched prior to dehydration.

3. A ready-to-eat preserved edible fruit product as claimed in claim 1, having a soluble solids content of about 45% to about 55%, a moisture content of about 40% to about 50% and a water activity of about 0.8 to 0.9.

4. A food product normally containing fruit comprising a food base and the product of claim 1.

5. The food of claim 4 in which the food base is a solid or semisolid dairy product.

6. A process of preparing a preserved ready-to-eat edible fruit product which comprises dehydrating natural fruit or fruit pieces to 20% to 50% of the fruits weight effective to reach a soluble solids content of 40% to 60%, and a water activity content of 0.75 to 0.90 in the dehydrated fruit, and thereinafter subjecting the fruit to frozen food storage conditions of 0° to −30° C. to obtain a stable fruit product, said product having no water activity controlling solutes added thereto, and said dehydrated fruit product remaining unfrozen, flexible and soft at temperatures of about −20° C.

7. A process as claimed in claim 6 wherein the fruit of fruit pieces are balanced prior to dehydration.

8. A process as claimed in claim 6 wherein said product is cooled and packaged prior to being stored in a freezer.

9. The process of claim 6 in which the product is subsequently pasteurized after storage.

10. A process as claimed in claim 8 wherein said product is held for an equilibration period of 24 hours prior to being placed in said freezer.

11. A method of processing fruit and preparing soft, non-freezable fruit comprising dehydrating fruit to 20% to 50% of its original weight to increase said fruits natural sugar content to about 50% total sugar content on a weight basis and thereinafter subjecting said fruit to frozen food storage conditions of 0° to −30° C. said processing effective to increase sweetness and flavor from greater than 2 to about 5 times the original sweetness and flavor and further effective to produce a fruit which remains soft to the bite, with good mouthfeel and a lack of excessive coldness and when eaten immediately after removal from storage at temperatures of about −20° C.

* * * * *